United States Patent [19]
Robinson

[11] Patent Number: 5,380,026
[45] Date of Patent: Jan. 10, 1995

[54] BICYCLE SHOCK ABSORBER

[76] Inventor: Russell Robinson, P.O. Box 417, Silverado, Calif. 92676

[21] Appl. No.: 102,579

[22] Filed: Aug. 5, 1993

Related U.S. Application Data

[63] Continuation of Ser. No. 749,571, Aug. 26, 1991, abandoned, and a continuation of Ser. No. 491,461, Mar. 9, 1990, Pat. No. 5,350,185.

[51] Int. Cl.⁶ .............................................. B62K 21/20
[52] U.S. Cl. .................... 280/276; 280/283; 267/226; 248/622
[58] Field of Search ......................... 280/275, 276, 283; 188/322.16–322.19; 267/224, 226; 248/622, 631

[56] References Cited

U.S. PATENT DOCUMENTS

| | | | |
|---|---|---|---|
| 448,750 | 3/1892 | Kenfield | 280/276 |
| 575,152 | 1/1897 | Fogg . | |
| 601,978 | 4/1898 | Nevill . | |
| 602,354 | 4/1894 | Ohlgart . | |
| 636,726 | 11/1899 | Hindmarsh . | |
| 658,909 | 10/1900 | Fraser . | |
| 979,483 | 12/1910 | Harley . | |
| 1,188,168 | 6/1916 | Genovese | 280/276 |
| 1,605,798 | 12/1923 | Van Crombrugge . | |
| 3,208,767 | 9/1965 | Moulton . | |
| 3,891,236 | 6/1975 | Kuwano et al. . | |
| 3,912,054 | 10/1975 | Fabre et al. . | |
| 3,931,990 | 1/1976 | Knapp . | |
| 3,982,770 | 9/1976 | Satoh et al. . | |
| 3,989,263 | 11/1976 | Stuck et al. . | |
| 4,182,508 | 1/1980 | Kallai et al. . | |
| 4,268,055 | 5/1981 | Bell | 280/278 |
| 4,421,337 | 12/1983 | Pratt . | |
| 4,553,769 | 11/1985 | Kawaguchi | 280/276 |
| 4,576,393 | 3/1986 | Moulton et al. . | |
| 4,582,343 | 4/1986 | Waugh . | |
| 4,679,811 | 7/1987 | Shuler . | |
| 4,705,491 | 11/1987 | Anderson | 464/167 |
| 4,736,983 | 4/1988 | Furbee . | |
| 4,815,763 | 3/1989 | Hartmann | 280/276 |
| 4,881,750 | 11/1989 | Hartmann | 280/276 |
| 5,044,648 | 9/1991 | Knapp | 280/283 |
| 5,088,705 | 2/1992 | Tsai | 280/276 |

FOREIGN PATENT DOCUMENTS

| | | |
|---|---|---|
| 421323 | 5/1947 | Italy . |
| 482796 | 7/1953 | Italy . |
| 535509 | 11/1955 | Italy . |

Primary Examiner—Eric D. Culbreth
Assistant Examiner—Carla Mattix
Attorney, Agent, or Firm—Plante & Strauss

[57] ABSTRACT

There is disclosed a shock absorber which is contained within the head tube of a bicycle. The shock absorber has an outer cylinder that is rotationally received within the head tube and secured at its upper end to a handlebar support member, such as a gooseneck. An inner cylinder is slidably received within the outer cylinder and secured at its lower end to the fork that supports the front wheel. Each of the cylinders has longitudinal grooves, the inner cylinder having longitudinal grooves on its outer surface which align with longitudinal grooves on the inside wall of the outer cylinder. A plurality of bearing balls are received in the tracks which are formed by the longitudinal grooves of the cylinders and a thin-wall bearing retainer is concentrically received between the inner and outer cylinders having a plurality of apertures at predetermined spacing which are aligned along the bearing tracks, each of the apertures capturing one of the bearing balls. Finally a compression spring is captured between the upper end of the inner cylinder and the upper end of the outer cylinder to bias the cylinders in an extended, telescoping position. Preferably, the assembly also includes a rod that is concentrically received in the assembly of the cylinders. The upper end of the rod is fixedly secured to the upper end of the outer cylinder and, at its lower end, supports a valve/piston that is slidably received within the inner cylinder. The inner cylinder is closed at its lower end and the piston has an annular seal to provide oil chambers in the inner cylinder below and above the valve/piston and improve the shock absorbency of the assembly.

12 Claims, 3 Drawing Sheets

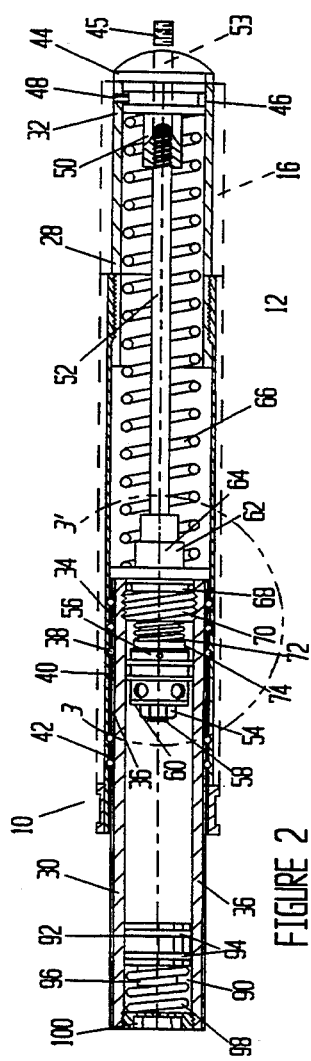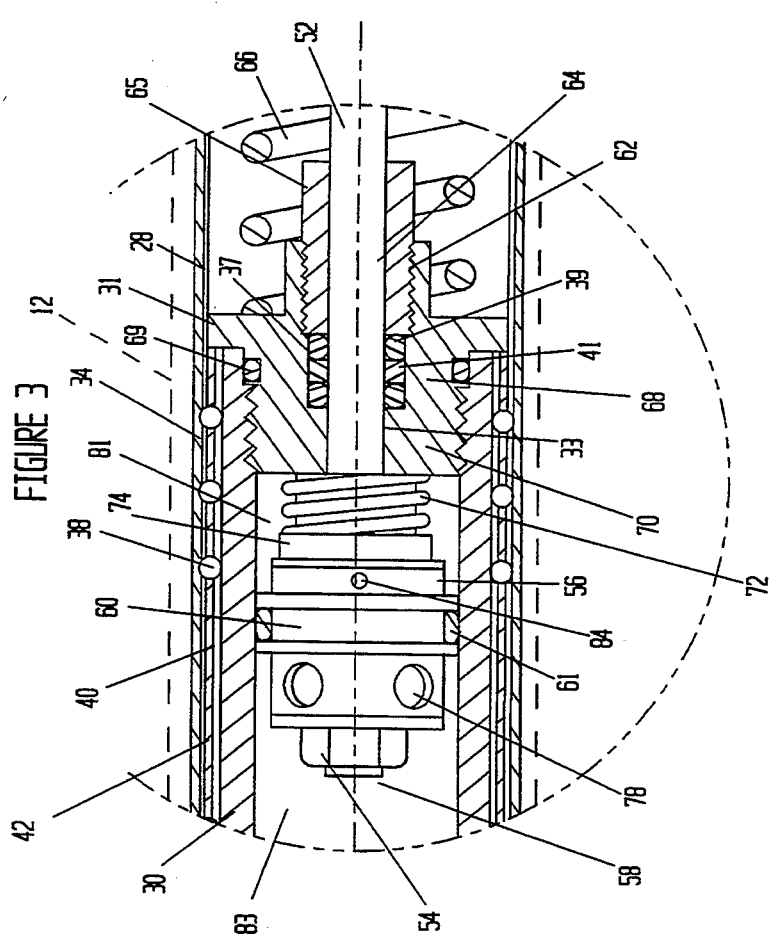

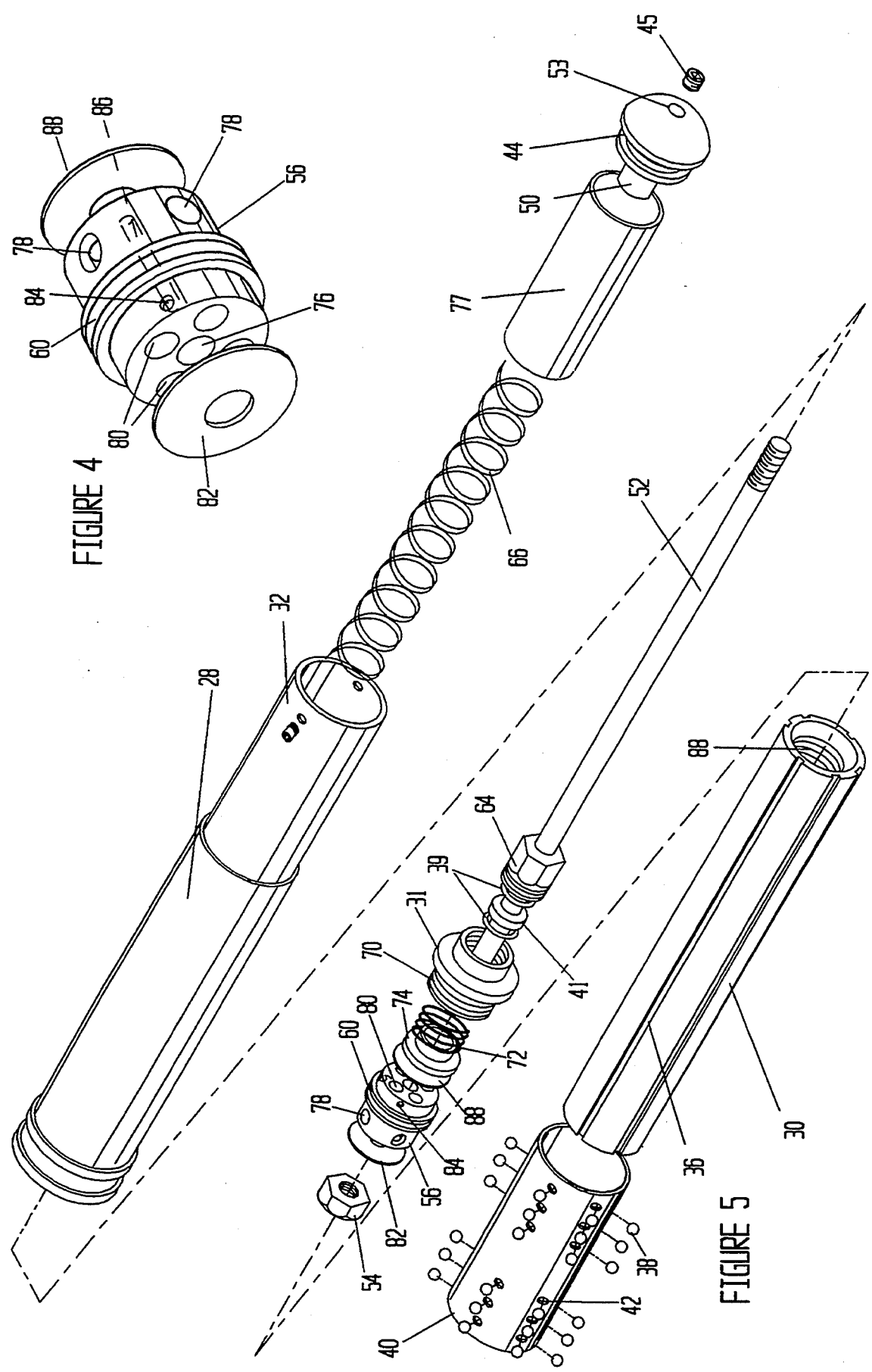

5,380,026

BICYCLE SHOCK ABSORBER

This is a continuation, of application Ser. No. 07/749,571, filed Aug. 26, 1991 now abandoned and is a continuation of application Ser. No. 07/491,461 filed Mar. 9, 1990 now patented, U.S. Pat. No. 5,350,185.

BACKGROUND OF THE INVENTION

1. Field of Invention

This invention relates to a shock absorber for a bicycle and, in particular, to a shock absorber for the front fork of a bicycle.

2. Brief Statement of the Prior Art

Although shock absorbers are commonly used on motorcycles and motorbikes, they have not been utilized to any degree on a conventional bicycle. Instead, the front wheel of a conventional bicycle is supported in a fork that is attached to a shaft which is rotatably received in the head tube of the bicycle frame. The upper end of the shaft is attached to the handlebars with a goose neck or other suitable attachment means.

Although the market for bicycles is extremely competitive, few attempts have been made to improve the riding comfort of a bicycle by providing shock absorbent elements in the frame. Factors which have, heretofore, precluded the use of shock absorbers are the hard use and harsh conditions to which bicycles are often exposed, e.g., motorcross bicycles and the like. Additionally, an acceptable shock absorber should be adaptable to retrofit existing bicycles and be compatible with existing bicycle frames without materially altering the angle of inclination of the frame or the head tube. These requirements and the necessity to maintain minimal mass and weight of the bicycle have effectively precluded use of shock absorbers.

One product which is available commercially is ROCKSHOX TM, which is a hydraulically dampened, air sprung front fork. This fork has cylindrical, telescoping tubes which serve as the tines of the front fork of a bicycle. A major disadvantage of this product is that it adds a substantial weight to the bicycle.

OBJECTIVES OF THE INVENTION

It is an object of this invention to provide a shock absorber for a bicycle which can retrofit existing bicycles and be provided with newly manufactured bicycles.

It is a further object of this invention to provide a shock absorber for the front suspension of a bicycle which is very durable and can be used on mountain bicycles which typically are used in off road racing.

It is a still further object of the invention to provide a bicycle shock absorber having low mass and weight and high strength.

It is a further object of the invention to provide the aforementioned shock absorber with a structure that is relatively inexpensive to manufacture.

It is likewise an object of the invention to provide a shock absorber for a bicycle which adds very little weight to a bicycle.

Other and related objects will be apparent from the following description of the invention.

BRIEF DESCRIPTION OF THE INVENTION

This invention comprises an improvement in the front suspension of a bicycle which typically has a head tube that rotationally receives a support shaft which is secured at its lower end to a fork and, at its upper end to the handlebars. The invention comprises a shock absorber which is substituted for the conventional support shaft. The shock absorber has an outer cylinder that is rotationally received within the head tube and secured at its upper end to a handlebar support member, such as a gooseneck. An inner cylinder is slidably received within the outer cylinder and secured at its lower end to the fork that supports the front wheel. Each of the cylinders has longitudinal grooves, the inner cylinder having longitudinal grooves on its outer surface which align with longitudinal grooves on the inside wall of the outer cylinder. A plurality of bearing balls are received in the tracks which are formed by the longitudinal grooves of the cylinders and a thin-wall bearing retainer is concentrically received between the inner and outer cylinders having a plurality of apertures at predetermined spacing which are aligned along the bearing tracks, each of the apertures capturing one of the bearing balls. Finally a compression spring is captured between the upper end of the inner cylinder and the upper end of the outer cylinder to bias the cylinders in an extended, telescoping position. Preferably, the assembly also includes a rod that is concentrically received in the assembly of the cylinders. The upper end of the rod is fixedly secured to the upper end of the outer cylinder and, at its lower end, supports a piston that is slidably received within the inner cylinder. The inner cylinder is closed at its lower end and the piston has an annular seal to provide an oil chamber in the inner cylinder and improve the shock absorbency of the assembly.

BRIEF DESCRIPTION OF THE DRAWINGS

FIG. 2 is a longitudinal cross section of the shock absorber of the invention;

FIG. 3 is an enlarged view of the area within line 3-3' of FIG. 2;

FIG. 4 is an enlarged perspective view of the valve/piston of the shock absorber; and FIG. 5 is an exploded perspective view showing the major components of the shock absorber of the invention.

DESCRIPTION OF PREFERRED EMBODIMENT

Figure 1:
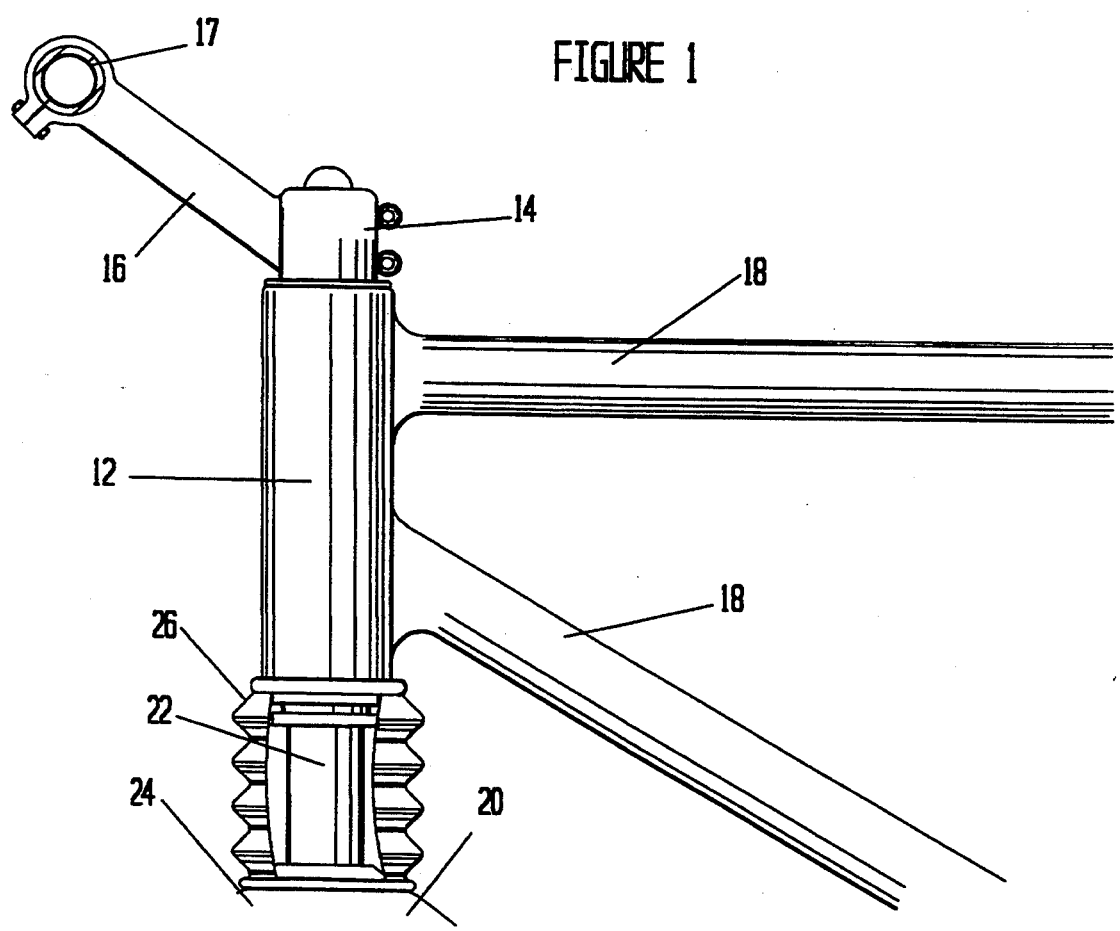
FIG. 1 illustrates the front end of a bicycle frame which has been fitted with the shock absorber of the invention.

Referring now to FIG. 1, the invention is a shock absorber that is fitted in the head tube 12 of a conventional bicycle frame having longitudinal rail members 18 and a front fork 20 for the front wheel and conventional handlebars. The shock absorber is received within the head tube 12 and, at its upper end, is fixedly secured to the lower end 14 of a conventional gooseneck 16 that serves as the handlebar attachment, securing the handlebars 17 to the shock absorber which is rotationally received within the head tube 12. The lower end 22 of the shock absorber is fixedly secured to the upper end 24 of a conventional fork 20 that supports the front wheel. The lower end 22 of the shock absorber 10 is telescopically received within the upper tube and, preferably, this lower end is enclosed within a resilient boot 26 that seals the assembly. Since most of the shock absorber of the invention is received within the head tube 12 of the bicycle, it increases the height of the front of the bicycle only slightly, e.g., about 2 inches. Additionally, the shock absorber has very low weight, adding only a few ounces to the overall bicycle weight, and in some applications actually weighs less than the parts it replaces.

Referring now to FIG. 2, the shock absorber 10 of the invention is shown in longitudinal sectional view. As there illustrated, the shock absorber 10 comprises an outer cylinder 28 that concentrically and slidably receives an inner cylinder 30 of close dimensions. The upper end 32 of the outer cylinder 28 is secured to a gooseneck 16 (shown in phantom lines) that attaches the handlebars while the remainder of the outer cylinder is received within the head tube 12 of the bicycle frame (also shown in phantom lines).

The outer cylinder 28 has at least one, and preferably eight longitudinal grooves 34 which are spaced at equal angular increments (45 degrees) along its inside wall. These grooves extend along the lower mid-portion of the outer cylinder 28 and are aligned with mating grooves 36 in the outer wall of the inner cylinder 30, forming longitudinal tracks therebetween. A plurality of bearing balls 38 are received in each of these tracks in rolling contact therein. These balls 38 are retained axially at predetermined locations by a retainer sleeve 40 which is a very thin-walled sleeve having a plurality of apertures 42 which are aligned along the track at predetermined incremental spacings to space the bearing balls 38 at the illustrated locations.

The upper end 32 of the outer cylinder 28 has a cap 44 which is received within the cylinder and is secured thereto by a plurality of pins 46 which seat in an annular groove 48 which extends about the lower end of the cap 44. The cap 44 has a cylindrical boss 50 on its inside wall and has a central threaded bore which receives rod 52. The rod 52 is thus concentrically positioned within the assembly of outer cylinder 28 and inner cylinder 30. The rod 52 extends to an intermediate position along the length of the outer cylinder and terminates with a piston 56 which is retained on the rod 52 with a retainer nut 54 that is received on the threaded lower end 58 of rod 52.

The construction of the assembly is more apparent from the enlarged sectional view of FIG. 3. The upper end of sleeve 30 is closed with a plug 31 (which is shown in sectional view in FIG. 3) that has a threaded boss 70 (see also FIG. 2) which is received in the threaded upper end of the sleeve 30. The boss 70 has an annular groove which receives an O-ring 69 to seal the plug 31 in sleeve 30. The sleeve 30 is filled with oil.

A piston 56 is fixedly secured to the lower end 58 of the rod 52 and this piston is received within the inner cylinder 30. The piston has an annular groove 60 that receives an annular seal such as an O-ring 61 to provide a sliding seal against the inside wall of the inner cylinder, thereby providing sealed oil chamber 83 below the piston and sealed oil chamber 81 above the piston. Plug 31 has a central through aperture 33 which slidably receives rod 52. The rod is sealed with a packing gland formed in a counterbore 37 in plug 31. A pair of O-rings 39 are seated in the counterbore 37 about rod 52, separated by a spacer ring 41. The outer end of plug 31 has a cylindrical boss 43 and the counterbore 37 is threaded at 62 to receive the threaded end of compression plug 64 which has wrench flats 65 at its outer end. The plug 64 compresses the packing gland to maintain a seal about the slidably received rod 52.

The boss 43 on the outer end of plug 31 serves as a spring retainer. A compression spring 66 is captured between the spring retainer (boss 43) and the cap 44 (see FIG. 2) to resiliently bias the assembly of inner and outer cylinders in the illustrated, extended position.

The limiting travel of piston 56 in the sleeve 31 is cushioned by a compression spring 72 which is captured against the inside face of plug 31 by a spring retainer 74. The spring retainer 74 and piston 56 are slidably received on rod 52. Alternatively, hollow cylindrical rubber plug with apertures in its side wall can be substituted for spring 72.

The piston 56 provides restricted flow orifices between the chamber 83 below the piston and the chamber 82, above the piston. The flow orifices are shown in the enlarged perspective view of the piston 56 which appears as FIG. 4. The piston 56 has a central through bore 76 which receives the rod 52. It also has preferably four axial bores 78 spaced at 90 degree angular increments about end 79. These axial bores 78 extend only partially into the body of piston 56, where they intersect axial bores 80 that extend into the body of piston 56 at opposite end 81. This creates four flow passageways through the piston 56. The end 79 of the piston 56 is covered with a flexible washer 82, preferably a thin steel washer. The washer 82 serves as a flow restrictor, preventing flow from entering the axial bores 78 and flexing slightly under applied pressure to permit flow of oil which enters the axial bores 78 of the piston 56.

The piston 56 also has two small diameter flow passageways which are formed by two radial bores 84 that are spaced at 180 degree angular increments at end 79 and which intersect axial bores 80 that extend from the end 89 of the piston 56. The upper face of the piston 56 is provided with a flexible washer 88, similar to washer 82, which serves as a flow restrictor and prevents flow through the piston from its end 81 while permitting flow from the lower end of the piston which enters the radial bores 84.

Referring now to FIG. 2, the lower end of the sleeve 30 has an air chamber 90 which is formed by piston 92 which has two spaced-apart annular grooves 94 that receive O-rings. The lower face of the piston 92 has a cylindrical boss 96 which serves as a spring retainer, capturing compression spring 98 against the inside face of plug 100. The plug 100 is threaded into the lower end of the cylinder 30. Piston 92 provides a variable volume to the oil chamber 83, thereby compensating for the volume of rod 52 which is displaced into this chamber during operation. The spring serves as a limiting travel cushion for the assembly, preventing damaging "bottoming out" of the shock absorber.

Referring now to FIG. 5, the major components of the shock absorber of the invention are shown in exploded perspective view. As there illustrated, the inner cylinder 30 has eight axial grooves 36 along its length and the thin-wall retainer sleeve 40 is received over this member. The sleeve has a plurality of aligned apertures 42 at predetermined spacings to serve as retainers for the bearing balls 38 that are located in the longitudinal tracks formed by the axial grooves in the sidewalls of the inner and outer cylinders. The piston 56, which is fixedly secured to the lower end 58 of the rod 52, supports an O-ring seal 61 and a similar O-ring seal 69 is provided on the cylindrical boss 70 of the plug 31. A resilient compression spring 72 is captured between plug 31 and piston 56.

At its upper end, the outer cylinder 28 receives a conventional compression spring 66 which, preferably, is received at its upper end within a thin-walled protective plastic sleeve 77. The cap 44 has a cylindrical boss 50 and a threaded through bore 53 to receive the threaded upper end of the rod 52. The rod is clamped to cap 44 by a set screw 45 which is also received in the threaded bore 53 and which is tightened against the end of the rod 52.

The lower end 14 of the inner cylinder 30 is closed with a plug 100 that is threaded into the sleeve 30. Piston 92 is received in the sleeve 30 with compression spring 98, all previously described with reference to FIG. 2.

The shock absorber of the invention is relatively simple and inexpensive assembly of inner and outer cylinders. The bearing balls that are received within the longitudinal tracks formed by the longitudinal grooves on the inner and outer cylinders provide a very smooth telescoping action with low frictional resistance while yet rotationally restraining these members. The compression spring and the pneumatic cylinder within the inner tube and the resilient cushion ensure smooth dampened action of the shock absorber and extended life even under very harsh conditions of use.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. In a front suspension for a bicycle having a frame supporting front and rear wheels with a front end which includes a head tube and a support shaft rotationally received therein and supporting on its lower end a fork frame which rotationally supports the front wheel, and at its opposite end, a handle bar support member, the improved support shaft which comprises:
    a. a first cylinder of uniform, first diameter rotationally received within said head tube and fixedly secured at its upper end to said handle bar support member;
    b. a second cylinder of uniform, second diameter with its upper end slidably engaged with said first cylinder in a concentric and telescopic assembly and fixedly secured at its lower end to said fork frame;
    c. rotational indexing means between said first and second cylinders including a longitudinal bearing track therebetween;
    d. a plurality of rolling surface bearings in rolling reception in said bearing track; and
    e. resilient compressive means within said first cylinder and located between said first and second cylinders to bias said cylinders in an extended telescoping position.

2. The improvement of claim 1 including a rod coaxially received within said second cylinder and fixedly secured at its upper end to the upper end of said first cylinder, and a plug received on the upper end of said second cylinder, sealing its interior, and having a central aperture which slidably receives said rod, with said rod bearing at its lower end, a piston which is slidably received within said second cylinder beneath said plug.

3. The improvement of claim 2 wherein said resilient compressive means is a compression spring, and including a spring retainer slidably received on said rod and seated on the upper, received end of said second cylinder.

4. The improvement of claim 3 wherein said spring retainer includes a cylindrical boss which is received within said second cylinder.

5. The improvement of claim 4 wherein said boss has an annular groove and including an annular resilient ring to seal the upper end of said second cylinder.

6. The improvement of claim 3 wherein said piston has an annular groove and includes an annular ring seated therein to provide a sliding seal within said second cylinder.

7. The improvement of claim 4 wherein the lower end of said second cylinder receives a closure plug.

8. The improvement of claim 7 wherein said closure plug includes a drain aperture with a drain plug threaded therein.

9. The improvement of claim 6 including a cylindrical resilient body mounted on said rod between said piston and said spring retainer.

10. The improvement of claim 9 wherein said resilient body is a hollow cylindrical rubber plug.

11. The improvement of claim 10 wherein said rubber plug has a plurality of apertures in its side wall.

12. The improvement of claim 2 including external threads on the upper end of said rod and also including a cap received on the upper end of said first cylinder and having a central threaded aperture which engages said external threads on the upper end of said rod, whereby the tension of said resilient compressive means can be fixedly adjusted.

* * * * *